US010693736B2

(12) United States Patent
Biem et al.

(10) Patent No.: US 10,693,736 B2
(45) Date of Patent: Jun. 23, 2020

(54) REAL TIME SIMULATION MONITORING (71) Applicant: International Business Machines Corporation, Armonk, NY (US)

(72) Inventors: Alain E. Biem, Mt. Kisco, NY (US); Bruce G. Elmegreen, Goldens Bridge, NY (US); Tayfun Gokmen, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 14/515,563

(22) Filed: Oct. 16, 2014

(65) Prior Publication Data

US 2016/0112274 A1    Apr. 21, 2016

(51) Int. Cl.
*H04L 12/24* (2006.01)
*G06F 11/34* (2006.01)
*H04L 12/26* (2006.01)

(52) U.S. Cl.
CPC ........ *H04L 41/145* (2013.01); *G06F 11/3466* (2013.01); *G06F 2201/805* (2013.01); *G06F 2201/86* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 5,774,695 A | * | 6/1998 | Autrey | .................... H04L 43/00 703/26 |
| 5,870,585 A | * | 2/1999 | Stapleton | .................. G06F 8/30 703/15 |
| 6,757,873 B2 | | 6/2004 | Yamaguchi | |
| 6,883,148 B1 | | 4/2005 | Teig et al. | |
| 6,952,664 B1 | * | 10/2005 | Lahiri | ................. G06F 17/5022 703/13 |
| 7,647,141 B2 | * | 1/2010 | Foster | ................. B61L 27/0055 434/29 |
| 7,680,637 B1 | * | 3/2010 | Wolodkin | ........... G06F 17/5022 703/6 |
| 7,759,991 B2 | | 7/2010 | Agarwal et al. | |
| 7,783,466 B2 | | 8/2010 | Jones et al. | |

(Continued)

OTHER PUBLICATIONS

Bruce Weed, "IBM InfoSphere Streams", Jun. 3, 2013, pp. 1-14.*

(Continued)

*Primary Examiner* — Brian W Wathen
*Assistant Examiner* — Phuong N Hoang
(74) *Attorney, Agent, or Firm* — Michael A. Petrocelli (57) ABSTRACT A method for monitoring at least one simulation program includes capturing, by a computer, a plurality of simulation data from the at least one simulation program, the capturing is performed in real time while the at least one simulation program is continuously streaming the plurality of simulation data, analyzing, by the computer, the captured plurality of simulation data using a streaming data software, identifying a plurality of predefined criteria within the analyzed plurality of simulation data, the plurality of predefined criteria includes at least one of an event, a result and a variable, and providing feedback to the at least one simulation program to modify a plurality of simulation parameters according to the at least one identified event, result and variable.

5 Claims, 4 Drawing Sheets (56) References Cited

U.S. PATENT DOCUMENTS

| | | | | |
|---|---|---|---|---|
| 7,809,545 B2* | 10/2010 | Ciolfi | ............... | G06F 8/443 |
| | | | | 703/22 |
| 8,060,259 B2* | 11/2011 | Budhraja | ............ | H02J 3/008 |
| | | | | 700/291 |
| 8,195,439 B1 | 6/2012 | Hussain | | |
| 8,271,256 B2 | 9/2012 | Khalily et al. | | |
| 8,275,584 B2 | 9/2012 | Lin et al. | | |
| 2002/0010917 A1* | 1/2002 | Srikantan | ............ | H04L 29/06 |
| | | | | 725/1 |
| 2003/0093254 A1* | 5/2003 | Frankel | ............ | H04L 43/50 |
| | | | | 703/13 |
| 2008/0145830 A1* | 6/2008 | Huang | ............ | G09B 9/00 |
| | | | | 434/336 |
| 2009/0063122 A1* | 3/2009 | Nasle | ............ | G05B 23/0235 |
| | | | | 703/18 |
| 2012/0030687 A1* | 2/2012 | Bhandiwad | ............ | G06F 9/544 |
| | | | | 719/312 |
| 2015/0037775 A1* | 2/2015 | Ottensmeyer | ......... | G09B 23/34 |
| | | | | 434/271 |

OTHER PUBLICATIONS

Newns et al., "A low-voltage high-speed electronic switch based on piezoelectric transduction," Journal of Applied Physics, vol. 111, No. 8, 2012, pp. 084509-1-084509-18.

O'uchi et al., "Characterization of Metal-Gate FinFET Variability Based on Measurements and Compact Model Analyses," IEEE International Electron Devices Meeting, IEDM, 2008, 4 pages.

Ketchen et al., "High Speed Test Structures for In-Line Process Monitoring and Model Calibration," Proceedings of the IEEE 2005 International Conference on Microelectronic Test Structures, vol. 18, Apr. 2005, pp. 33-38.

\* cited by examiner

REAL TIME SIMULATION MONITORING

BACKGROUND

The present invention generally relates to monitoring of computer simulations and more particularly to using a streaming data software for real time monitoring of large simulation programs.

Currently, computer simulations of physical processes are common in many fields of science, engineering, manufacturing, and medical research. They may be used to, for example, help forecasting weather conditions for daily public use, and to predict long-term climate variations which may be used by insurance companies and government policies. Computer simulations may also be used by financial services companies to predict market changes and by world organizations to predict long-term economies.

Key to all of these simulations may be numerous arithmetic computations which sometimes may exceed one quintillion ($1 \times 10^{18}$). Each arithmetic computation may involve numerous variables (sometimes thousands) in what may be a very complex algorithm describing the relationships between these variables in mathematical terms. These highly intricate computer simulations may run for hours, days or months and they may produce output measured in Terabytes or Petabytes that may be stored on disk hard drives. The results of these simulations may then be viewed in many ways, from graphs to videos.

SUMMARY

According to an embodiment of the present disclosure, a method for monitoring at least one simulation program may include capturing, by a computer, a plurality of simulation data from the at least one simulation program, the capturing may be performed in real time while the at least one simulation program may be continuously streaming the plurality of simulation data, analyzing, by the computer, the captured plurality of simulation data using a streaming data software, identifying a plurality of predefined criteria within the analyzed plurality of simulation data, the plurality of predefined criteria may include at least one of an event, a result and a variable, and providing feedback to the at least one simulation program to modify a plurality of simulation parameters according to the at least one identified event, result and variable.

According to another embodiment of the present disclosure, an information processing system for monitoring at least one simulation program may include a memory, a processor communicatively coupled to the memory, and a module for monitoring the at least one simulation program communicatively coupled to the memory and the processor, the module for monitoring the at least one simulation program may be configured to perform a method including capturing, by a computer, a plurality of simulation data from the at least one simulation program, the capturing may be performed in real time while the at least one simulation program may be continuously streaming the plurality of simulation data, analyzing, by the computer, the captured plurality of simulation data using a streaming data software, identifying a plurality of predefined criteria within the analyzed plurality of simulation data, the plurality of predefined criteria may include at least one of an event, a result and a variable, and providing feedback to the at least one simulation program to modify a plurality of simulation parameters according to the at least one identified event, result and variable.

According to another embodiment of the present disclosure, a computer program product for monitoring at least one simulation program may include a computer readable non-transitory article of manufacture tangibly embodying computer readable instructions which, when executed, cause a computer to carry out a method including capturing, by a computer, a plurality of simulation data from the at least one simulation program, the capturing may be performed in real time while the at least one simulation program may be continuously streaming the plurality of simulation data, analyzing, by the computer, the captured plurality of simulation data using a streaming data software, identifying a plurality of predefined criteria within the analyzed plurality of simulation data, the plurality of predefined criteria may include at least one of an event, a result and a variable, and providing feedback to the at least one simulation program to modify a plurality of simulation parameters according to the at least one identified event, result and variable.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for real time monitoring of a simulation program. Typically, computer simulations generate many more variable values while they run than they can possibly store on disk hard drives, considering typical disk write speeds are only several hundred Mbytes per second. Thus, computer programs output to disk only intermittently, generally at times when the user judges the information to be important such as for the frames of a video. Between these write times there are an enormous number of variable values inside the memory of the computer used for the calculation as it progresses and then discarded. Some of this discarded information may contain interesting features of the simulation, or statistical fluctuations that may be useful to know, or large and sudden excursions that may be important. If the user knows what to look for, then these features may be included in the computer program from the start and then monitored and printed when they are found. But often the user may not know everything that may be interesting, or may not wish to stop a long-running job before it ends just to start it again in search for something new that may suddenly seem more interesting. Also, standard methods for monitoring large simulation processes may be cumbersome and coupled which implies that the resources have to be shared between the simulation computation and the monitoring process.

A potential solution to the problem of lost simulation data and coupled simulation and monitoring may include monitoring the simulation using different processors or different computers through socket connections using a streaming data software. Only a few lines may be added to the simulation code in order to write important variables describing the state of the simulation to a user-defined socket. Then the streaming data software, running on any other computer, may receive data from the user-defined socket whenever it is available. If the simulation is running in parallel on many nodes, then each node or each grouping of nodes may write to their own socket and the whole simulation may write to many thousands of sockets. The streaming data software may then read from all of the sockets as the numbers appear. It should be noted that larger computers may need to run streaming software codes that are tasked to operate with larger simulation codes. In general, the computer running the streaming data software may be much smaller than the simulation computer.

Therefore, by using a streaming data software, embodiments of the present disclosure may, among other potential benefits, provide real time analysis of large simulation programs to look for events, results and/or variables of interest to users or third parties and allow modifying simulation parameters on the fly without any detriment to the original simulation code and without reducing disk space in the main computer.

The present invention generally relates to monitoring of computer simulations and more particularly to using a streaming data software for real time monitoring of large simulation programs. One way to use the streaming data software for real time monitoring of large simulation programs may include monitoring the simulation process from a different processor or computer connected through a transportation infrastructure or communication network with the computer in which the main simulation program is executed. One embodiment by which to use the streaming data software for real time monitoring of large simulation programs is described in detail below by referring to the accompanying drawings in FIGS. 1-4.

Figure 1:
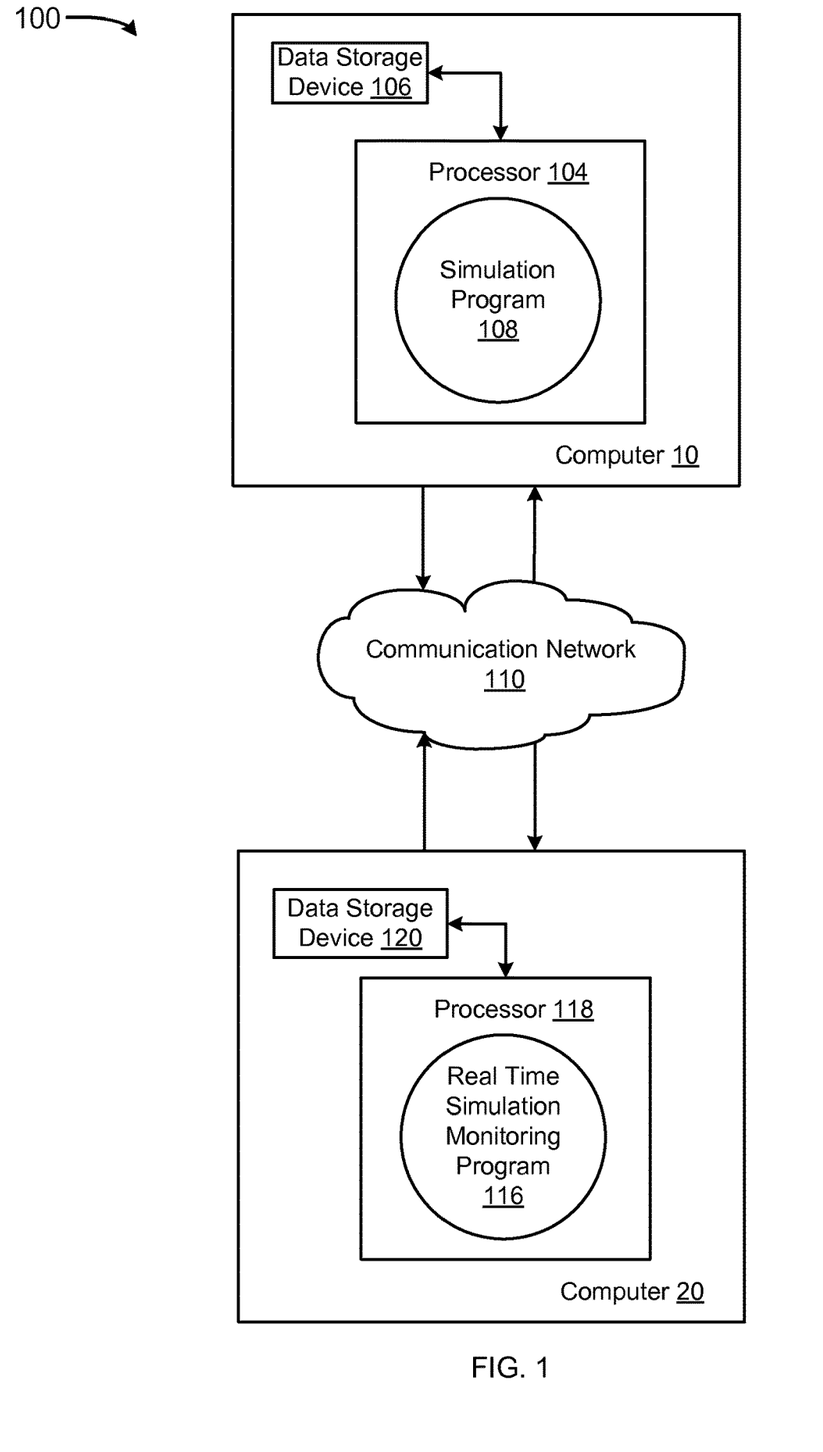
FIG. 1 illustrates a networked computer environment, according to an embodiment of the present disclosure.

Referring now to FIG. 1, an exemplary networked computer environment 100 is depicted, according to an embodiment of the present disclosure. The networked computer environment 100 may include a computer 10 with a data storage device 106 and a processor 104 that is enabled to run a simulation program 108. The simulation program 108 may include, for example, a large numerical simulation code used to model and simulate the behavior of relevant processes and their effect, such relevant processes may include fluid dynamics, weather conditions, and heat transport among others. The networked computer environment 100 may also include a computer 20 with a data storage device 120 and a processor 118 that is enabled to run a real time simulation monitoring program 116. In one embodiment, the computer 20 may be a server. In another embodiment, the computer 20 may not include the data storage device 120. In embodiments in which the computer 20 may not include the data storage device 120, the computer 20 may be, for example, a mobile phone. The computer 10 may communicate with the computer 20 via the communication network 110. The communication network 110 may include connections, such as wire, wireless communication links, or fiber optic cables. In one exemplary embodiment, the communication network 110 may include a socket port using an internet protocol. The communication network 110 may include various types of communication networks, such as a wide area network (WAN), local area network (LAN), a telecommunication network, a wireless network, a public switched network and/or a satellite network.

As will be discussed below with reference to FIG. 4, the computer 20 may include internal components 800a and external components 900a, respectively and the computer 10 may include internal components 800b and external components 900b, respectively. The computer 20 may be, for example, a mobile device, a telephone, a PDA, a netbook, a laptop computer, a tablet computer, a desktop computer, or any type of computing device capable of running a program and accessing a network.

It should be noted that the networked computer environment 100 may include a plurality of computers 10 and a plurality of computers 20, however only one of which is shown for illustrative brevity. It may be appreciated that FIG. 1 provides only an illustration of one implementation and does not imply any limitations with regard to the environments in which different embodiments may be implemented. Many modifications to the depicted environments may be made based on design and implementation requirements.

A program, such as the real time simulation monitoring program 116 may run on the computer 20. The real time simulation monitoring program 116 may be used to provide real time analysis of the simulation program 108 to look for events, results and/or variables of interest to users or third parties and allow modifying simulation parameters on the fly without any detriment to the original simulation code and without reducing storage space in the data storage device 106 of the computer 10.

It should be noted that although only one simulation program 108 is described as being executed, numerous simulation programs may be simultaneously run in the computer 10 or different computers, each simulation program may then be monitored by one or more real time simulation monitoring programs 116 via one or more communication networks 110.

Figure 2:
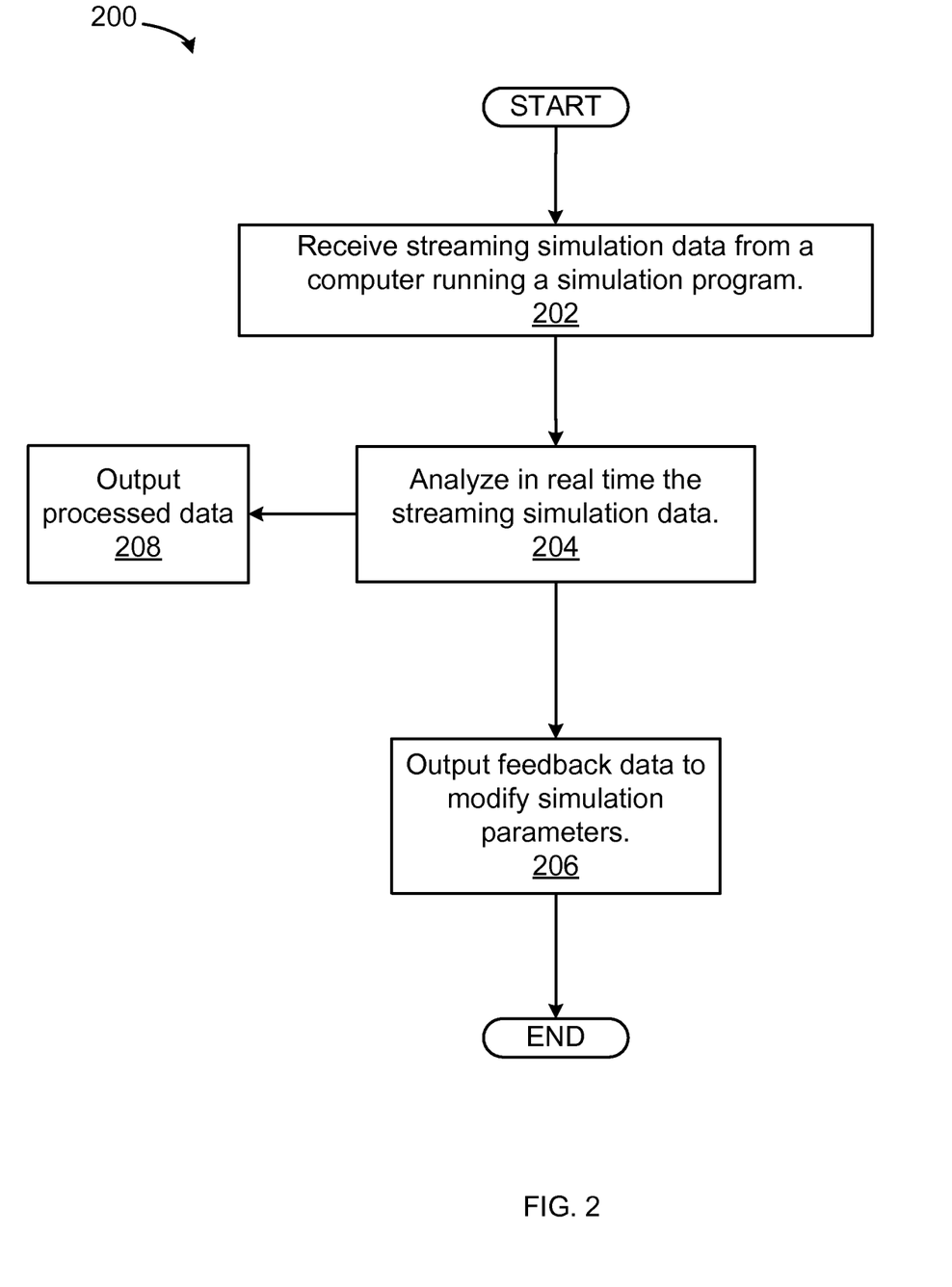
FIG. 2 is a flow chart illustrating steps of a real time simulation monitoring program, according to an embodiment of the present disclosure.

Referring now to FIG. 2, a flow chart 200 illustrating the steps of the real time simulation monitoring program 116 (FIG. 1) is shown, according to an embodiment of the present disclosure. At step 202, the real time simulation monitoring program 116 (FIG. 1) may capture simulation data streaming from the computer 10 (FIG. 1) executing the simulation program 108 (FIG. 1) via the communication network 110 (FIG. 1). Stated differently, the simulation program 108 (FIG. 1) sends simulation data, also referred to as unprocessed or raw data, to the communication network 110 (FIG. 1), from there the simulation data may be retrieved or captured by the real time simulation monitoring program 116 (FIG. 1) at step 202. Remote real time analysis of the captured simulation data may occur at step 204 in the computer 20 (FIG. 1). It should be noted that the simulation data is captured completely by the computer 20 (FIG. 1) running the real time simulation monitoring program 116 (FIG. 1) without regard to data volume.

According to one embodiment, the real time simulation monitoring program 116 (FIG. 1) may include a real time monitoring module and an event controller module. The real time monitoring module may perform real time analytics of the simulation data while communicating with the event controller module. The event controller module may identify events, variables or results of interest during the simulation run and output feedback data to the simulation program 108 (FIG. 1) at step 206, based on this feedback data simulation parameters may be modified on the fly, without stopping the simulation run or changing the original simulation code.

In some embodiments, the analyzed simulation data, also referred to as processed data, may be output to a different location for later use (e.g. step 208). In such embodiments, the processed data including analyzed results may be available to an interested party that may pay for this service. In general, the output processed data at step 208 may have much less volume than the raw simulation data, making it more easily distributed between third parties based on their individual interests or needs.

The real time simulation monitoring program 116 (FIG. 1) may continuously capture and analyze output data from the simulation program 108 (FIG. 1) using any stream data software currently available to analyze large amounts of data. In one embodiment of the present disclosure, the real time monitoring module of the real time simulation monitoring program 116 (FIG. 1) may use IBM Infosphere Streams system. Infosphere Streams is a data management middleware that operates on streaming data from any number of sources using programs designed by a user and running on parallel processors. It contains libraries for statistical and other analyses and also runs the user's own code. Significantly, all of this analysis may happen without writing or reading from a disk, and it may use computer resources of arbitrary size in a different location than the main simulation computer (e.g. computer 10 in FIG. 1). In addition, there is no interfering with the running simulation as the monitoring process is running independently from the simulation itself. In another embodiment, the real time monitoring module may use Matlab® or a user-built streaming data code.

The event controller module may communicate to the simulation program 108 (FIG. 1) any event, variable or result of interest identified during execution of the simulation program in a real time fashion. The identified events, variables or results of interest may be based on a predefined criteria specified by the user. The event controller module may provide feedback to the simulation program 108 (FIG. 1) such that simulation parameters may be modified according to the events, results or variables of interest detected during analysis of the simulation data.

The simulation program 108 (FIG. 1) may write data to the communication network 110. The data writing process from the simulation program 108 to the communication network 110 may take only a few additional cycles and no memory from the computer 10 (FIG. 1). It should be noted that the data writing process may proceed at the high data rate of the total IO bandwidth to the computer 10 (FIG. 1). This may have virtually no impact on the timing and memory of the simulation program 108 executed in the computer 10 depicted in FIG. 1.

The real time simulation monitoring program 116 may allow for the separation of computational resources for the simulation part and the analytics part in order to get optimal use of both types of hardware. In some embodiments, it is possible to implement specialized hardware and software for the simulation part including, but not limited to, the use of hardware accelerators and optimized networks for special simulations, the use of proprietary simulation software combined with a specialist staff that may be an expert in optimizing computer simulations. Also, specialized hardware and software may be implemented for the analytics part including, but not limited to, processors and networks that may be optimized for streaming data and visualization of results, commercial analytics or other special purpose software, combined with a specialist staff that may be an expert in streaming analytics methods.

In some embodiments, a single simulation may be analyzed using many different computing devices simultaneously at different locations around the world, thereby increasing the utility and impact of the analyzed simulation results. This feature of the real time simulation monitoring program 116 may be useful for simulations of general world-wide interest such as, for example, weather, economy, transportation, and emergency response.

By implementing the real time simulation monitoring program 116, access to virtually all of the simulation data from the simulation program 108 (FIG. 1) may be allowed, including simulation results with rapid fluctuations and intermittent behavior which may be typically lost in conventional simulations that may store data infrequently.

In some embodiments, the analysis of a running simulation may be adjusted by adding or removing analytics routines on the fly, without disrupting the simulation, in order to look for new physical processes or expand around interesting features detected by the real time simulation monitoring program 116.

With a multi-component structure for detailed analysis of running simulations, independent analysis may be provided during execution of large simulation codes in order to look for events, results or variables of interests, results specific to a region, client, or demography, having the ability to change the analysis on the fly without any detriment to the original simulation code. Only a few lines may need to be added to the original simulation code in order to write variable values to a user-defined socket or communication network. The same or another computer in the same or different location may then receive data from the user-defined socket or communication network whenever it is available. If the simulation is running in parallel on many nodes, then each node or each grouping of nodes may write to their own user-defined socket or communication network. The whole simulation may write to many thousands of user-defined sockets or communication networks. The computer performing the analysis (i.e., computer 20) may then read from all of the user-defined sockets or communication networks as the numbers appear and stream the data via a specially designed streaming software.

Feedback data or control information may be sent back to the running simulation program based on the results of the streaming analysis or on any other information, such as for example from physical sensors. The feedback data may, for example, modify boundary conditions or constants in a numerical simulation, adjust time step size or any other parameters that may be set to receive outside instructions. By doing so, a system of users, intelligent machines, or network of sensors may modify the simulation in a real time fashion from remote locations based on the current state of the simulation variables. In some embodiments, the detected events, results and/or variables of interest contained in the feedback data may also be available to interested parties as described above.

It may be appreciated that FIG. 2 provides only an illustration of one implementation and does not imply any limitations with regard to how different embodiments may be implemented. Many modifications to the depicted environments may be made based on design and implementation requirements. For example, as previously described with respect to an alternate implementation, a plurality of simulation programs may run in one or more computers and may be monitored by a plurality of monitoring simulation programs executed in one or more computers that may be physically present in different locations as will be described below with reference to FIG. 3.

Figure 3:
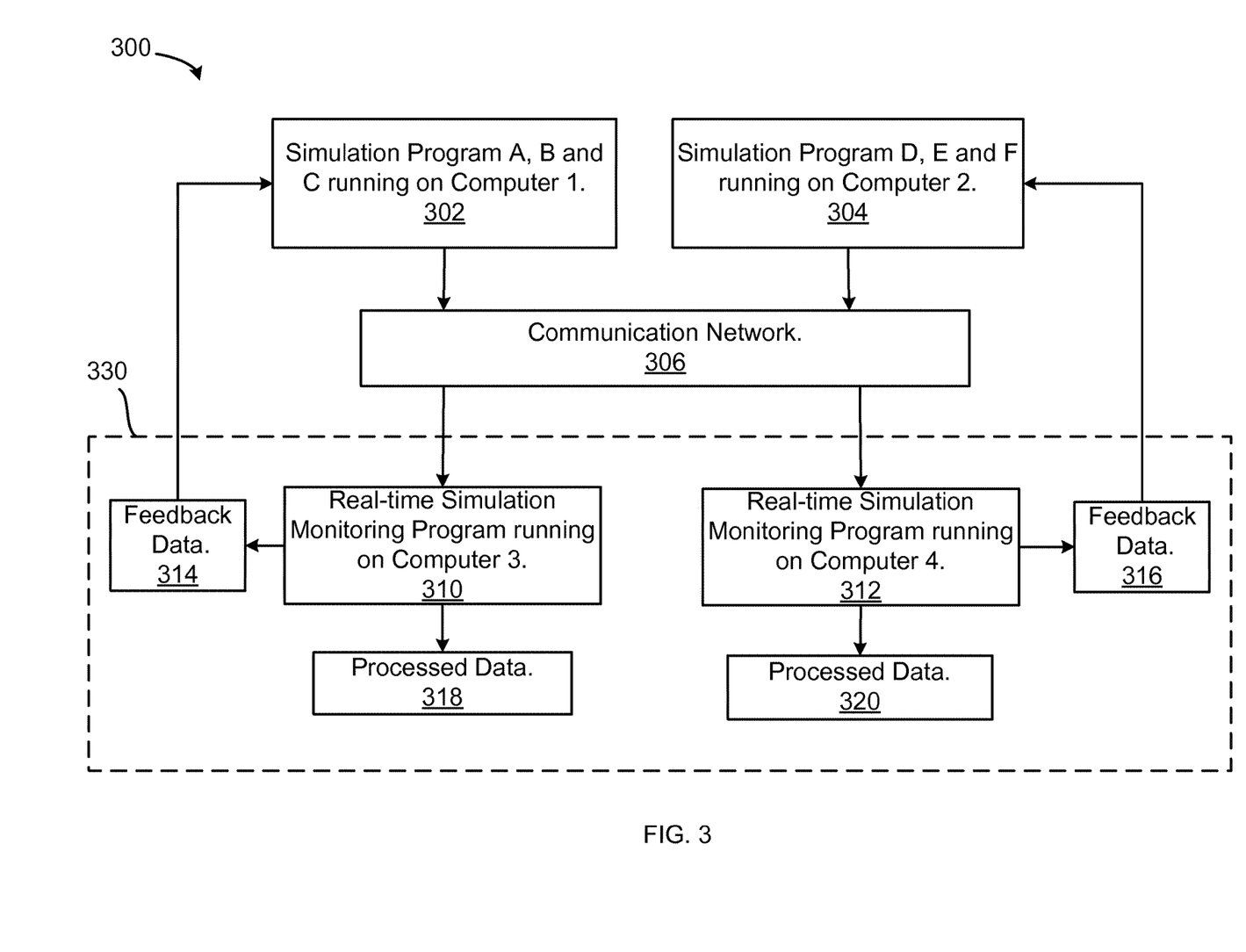
FIG. 3 is a block diagram of an exemplary configuration of a multi-component real time simulation monitoring program, according to an embodiment of the present disclosure.

Referring now to FIG. 3, a block diagram 300 illustrating an exemplary configuration of a multi-component real time simulation monitoring environment is shown, according to an embodiment of the present disclosure. In this exemplary embodiment, simulation programs A, B, and C may run on a computer 1 at 302 while simulation programs D, E and F may run on a computer 2 at 304. The computers 1, 2 may run one or all of the simulation programs simultaneously. Simulation data from each of the simulation programs being executed in the computers 1, 2 may be sent via a communication network at 306 to a streaming analytics platform 330. The streaming analytics platform 330 may include a real time simulation monitoring program running on a computer 3 at 310 and a real time monitoring simulation program running on a computer 4 at 312. The real time simulation monitoring program at 310 continuously captures and analyzes simulation data from the simulation programs A, B, and C running on computer 1 while the real time simulation monitoring program at 312 continuously captures and analyzes simulation data from the simulation programs D, E, and F running on computer 2.

If an event, variable or result of interest is detected during the analysis of each of the simulation runs, feedback data may be sent to the computers 1, 2 at 314, 316 respectively. Based on this feedback data the simulation parameters of one or more of the monitored simulation programs being executed in the computers 1, 2 may be modified remotely and on the fly, as described above. Processed simulation data from each of the simulation programs may be output to another location for later distribution to interested parties at 318 and 320, as previously described with reference to step 208 in FIG. 2.

Figure 4:
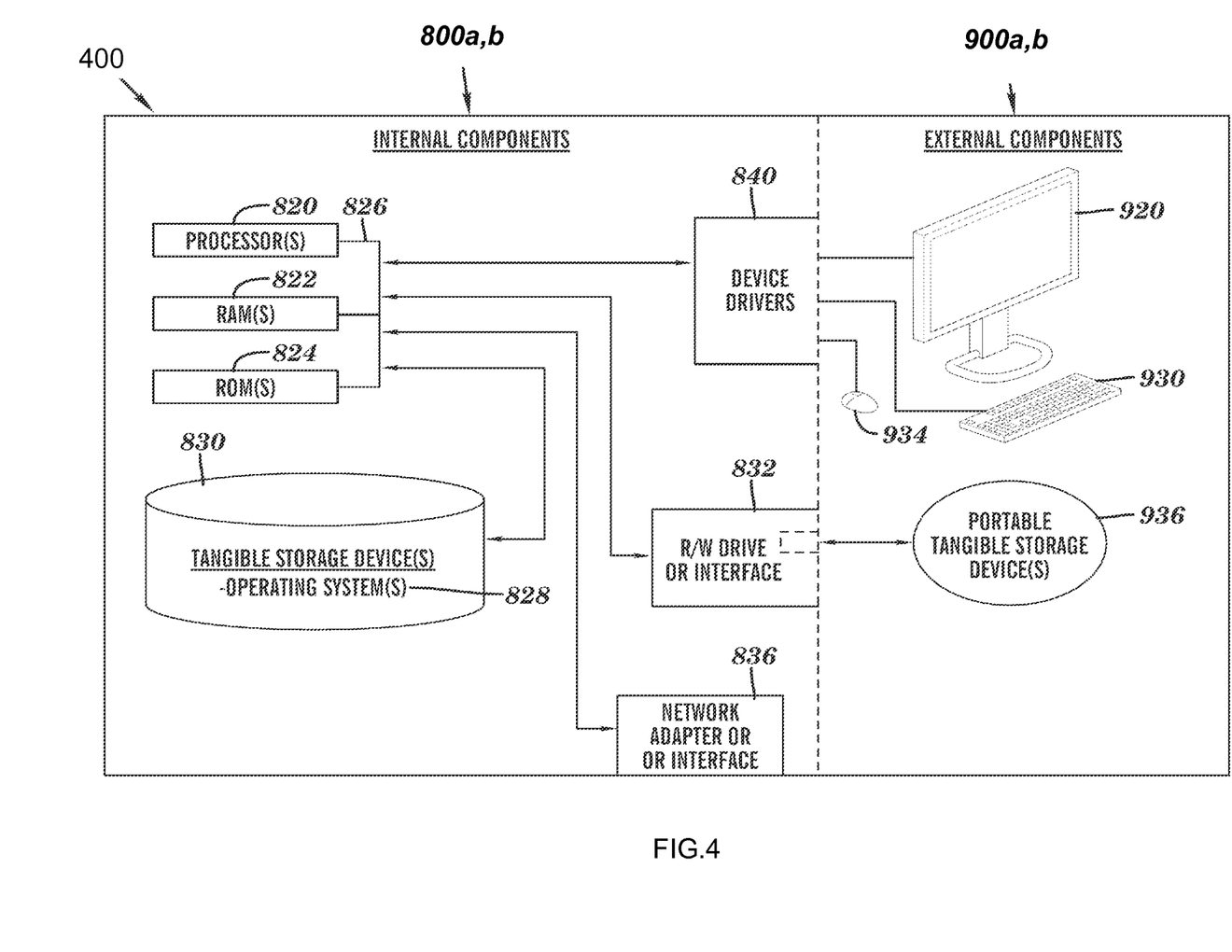
FIG. 4 is a block diagram of internal and external components of computers and servers depicted in FIG. 1 according to an embodiment of the present disclosure.

Referring now to FIG. 4, a block diagram 400 of internal and external components of the computers depicted in FIG. 1 is shown, according to an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 10 (FIG. 1), and computer 20 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a real time simulation monitoring program 116 (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The real time simulation monitoring program 116 (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless Wi-Fi interface cards, or 3G or 4G wireless interface cards or other wired or wireless communication links. The simulation program 108 (FIG. 1) in the computer 10 (FIG. 1) and the real time simulation monitoring program 116 (FIG. 1) in the computer 20 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the simulation program 108 (FIG. 1) in computer 10 (FIG. 1) and the real time simulation monitoring program 116 (FIG. 1) in computer 20 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Therefore, by sending simulation data from at least one simulation program via one or more communication network to at least one computer running a streaming data software, remote analysis of large amount of output data generated by the at least one simulation program may be performed allowing the modification of simulation parameters on the fly without changing the original simulation code or reducing storage space. Additionally, analyzed or processed simulation data may be available to interested parties or customers, making streaming analytics a potentially profitable service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring from a second computer a simulation program running on a first computer, comprising:
    receiving, by the first computer, instructions to write simulation data describing a state of the simulation program to a user-defined socket associated with the first computer;
    based on the instructions, continuously writing, by the first computer, the simulation data to the user-defined socket, wherein writing the simulation data proceeds at a high data rate of a total TO bandwidth such that it has no impact on timing and memory of the simulation program;
    continuously capturing, by the second computer in a location different than a location of the first computer, the simulation data from the user-defined socket using an internet protocol, the capturing is performed in real-time while the simulation program streams the simulation data;
    continuously analyzing, by the second computer, the captured simulation data using a user-defined streaming data software comprising a data management middleware operating on streaming data from different sources without interfering with the simulation program running on the first computer and without writing or reading from a disk, the second computer comprising an event controller module in communication with the first computer;
    receiving, at the event controller module, a predefined criteria specified by a user of the first computer, the predefined criteria identifies events, results, and variable of interests for the user during execution of the simulation program;
    based on the predefined criteria specified by the user of the first computer, identifying, by the event controller module, feedback data in the captured simulation data comprising at least one of the events, the results, or the variable of interests for the user;
    sending, by the event controller module, the feedback data from the second computer to the first computer running the simulation program;
    receiving, by the first computer, the feedback data;
    based on the received feedback data, modifying in real-time at least one of a boundary condition, a simulation constant, or a time step size of the simulation program running on the first computer without stopping the execution of the simulation program, without changing the simulation code, and without reducing disk space;
    sending, by the second computer, the analyzed simulation data to a storage device in a location different than the first computer and the second computer to maximize disk space; and
    providing the analyzed simulation data from the storage device to at least one interested party or customer.

2. The method of claim 1, wherein the first computer comprises a plurality of computer nodes, with each computer node writing simulation data to a corresponding socket port.

3. The method of claim 2, wherein the plurality of computer nodes is running the simulation program in parallel.

4. The method of claim 3, wherein each of the plurality of computer nodes is running a different simulation program.

5. The method of claim 1, wherein the simulation data comprises raw unprocessed data, the raw unprocessed data is captured completely by the second computer, wherein the simulation data after being analyzed and processed by the second computer has a volume that is substantially less than a volume of the raw unprocessed data.

* * * * *